Jan. 8, 1924.
W. N. PARKES
1,480,106
SEWING MACHINE
Filed Feb. 1, 1919
8 Sheets-Sheet 2
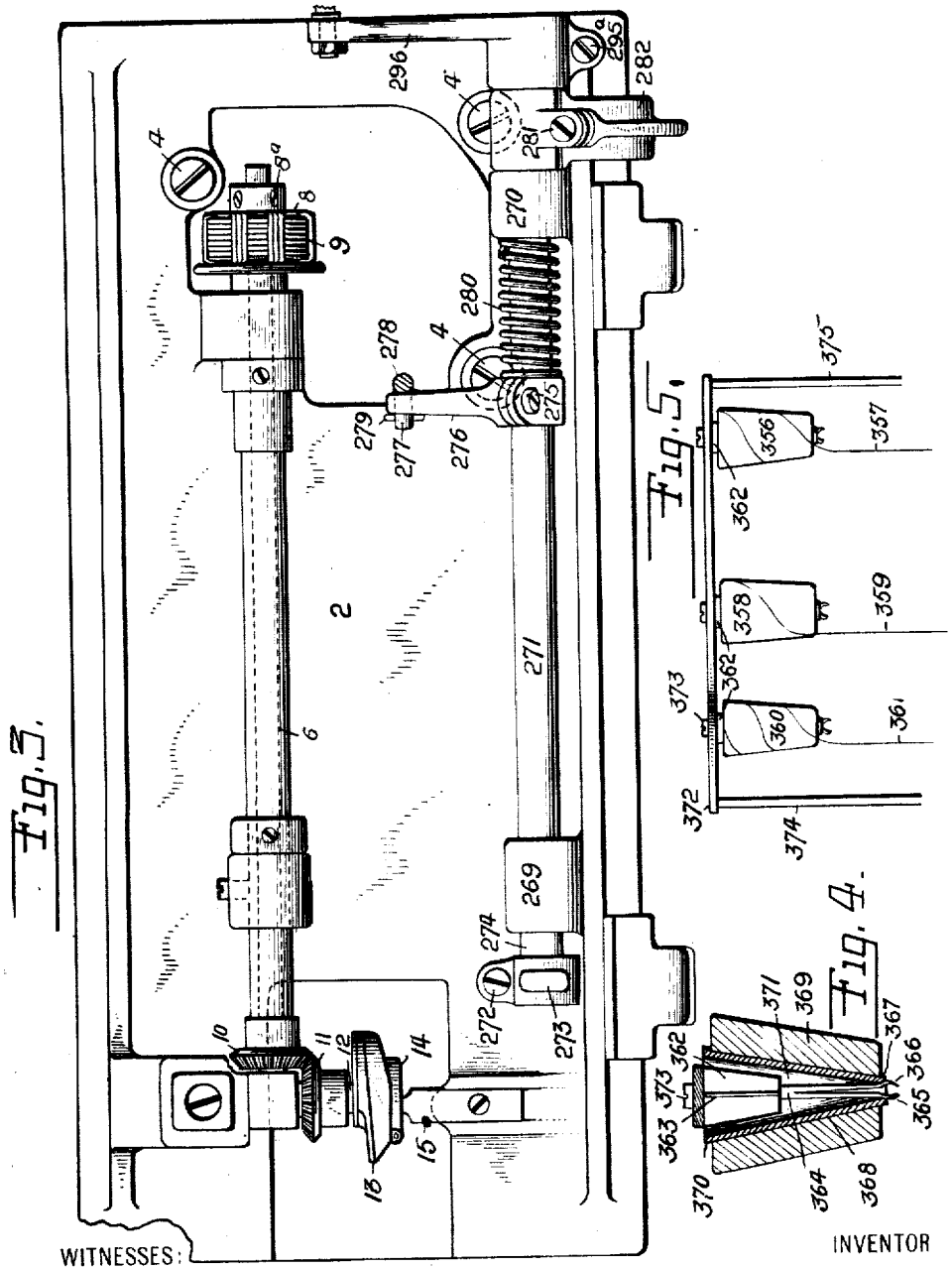

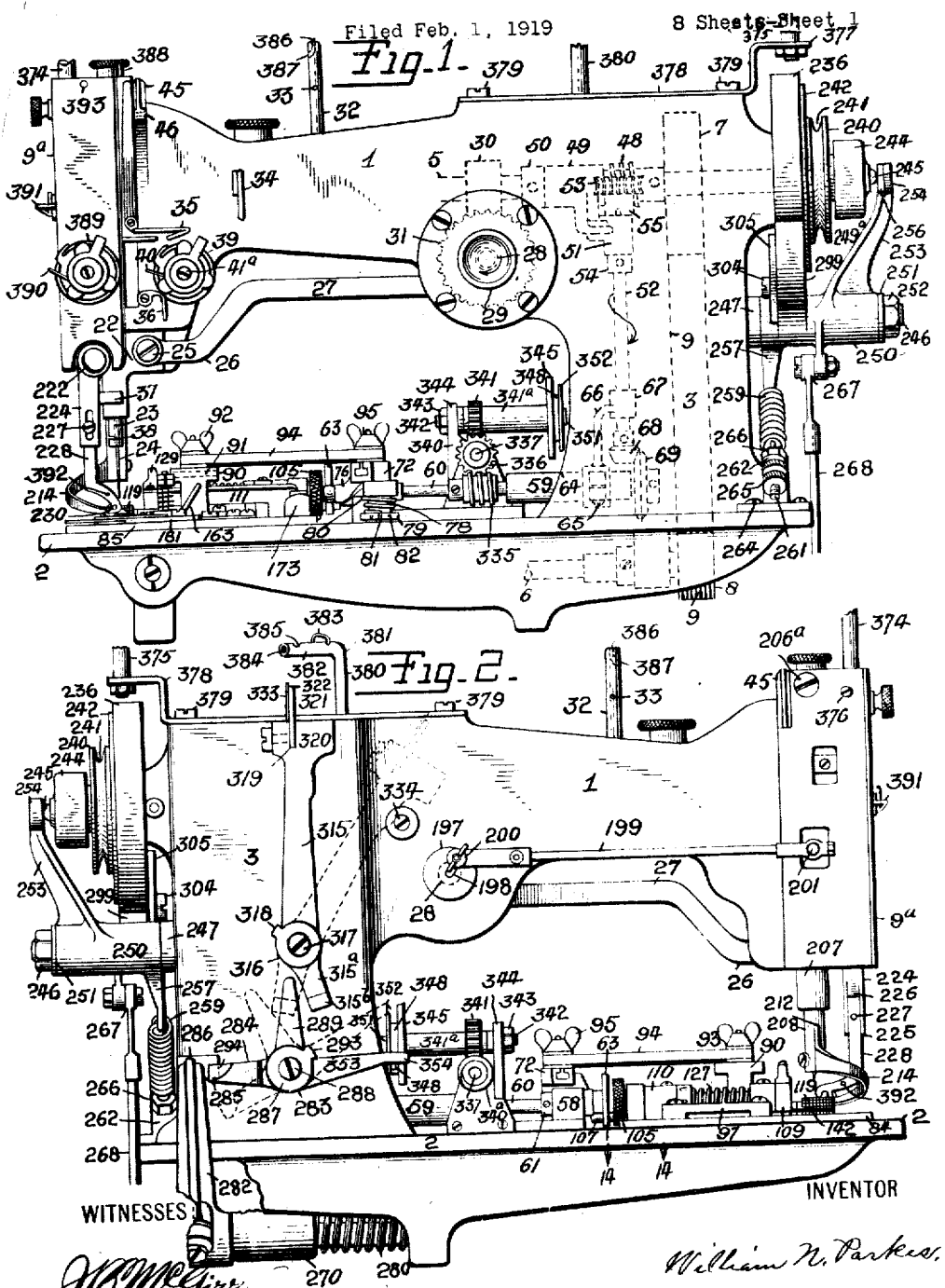

Jan. 8, 1924.
W. N. PARKES
SEWING MACHINE
Filed Feb. 1, 1919
1,480,106
8 Sheets-Sheet 3
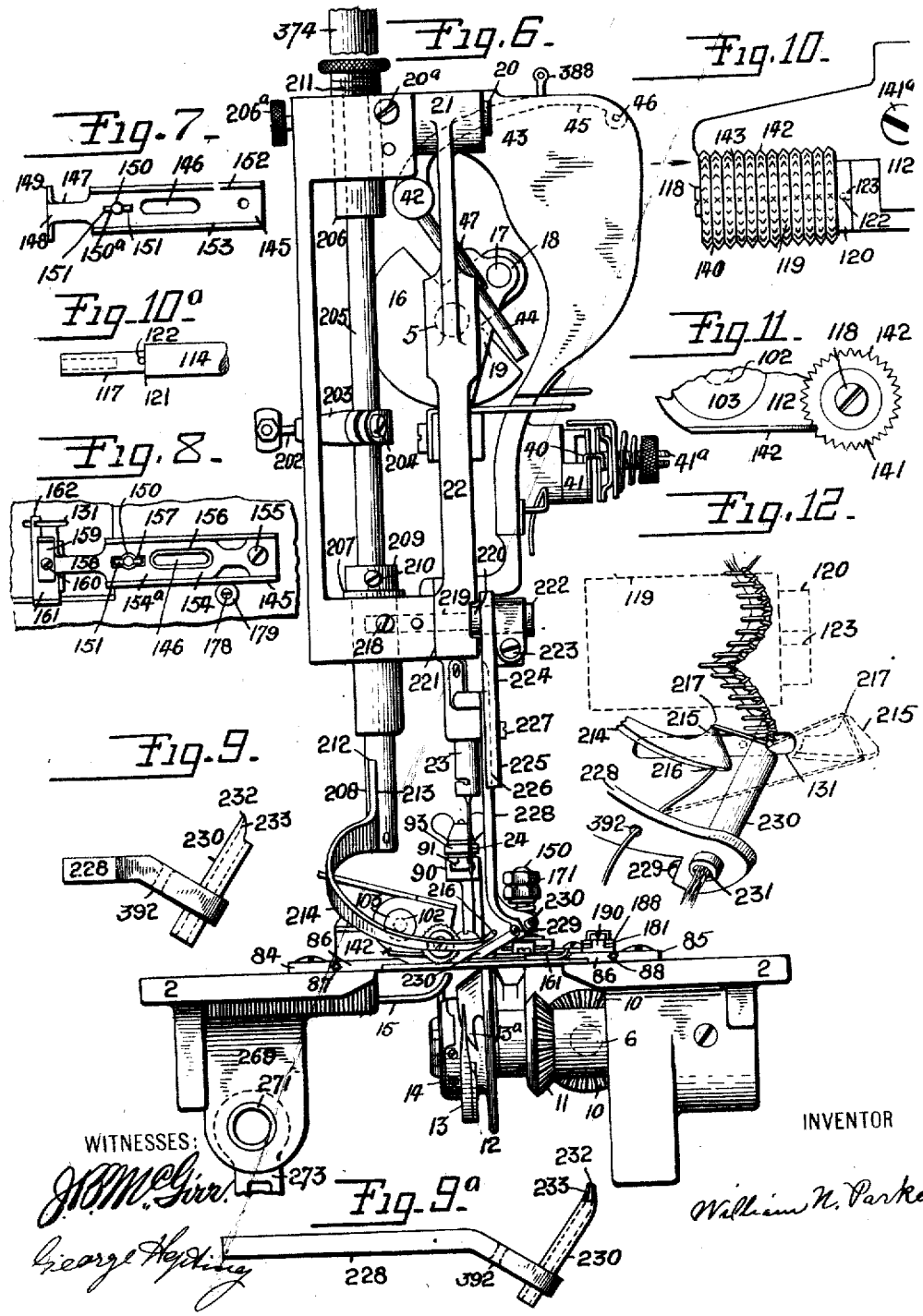
WITNESSES
INVENTOR
William N. Parkes

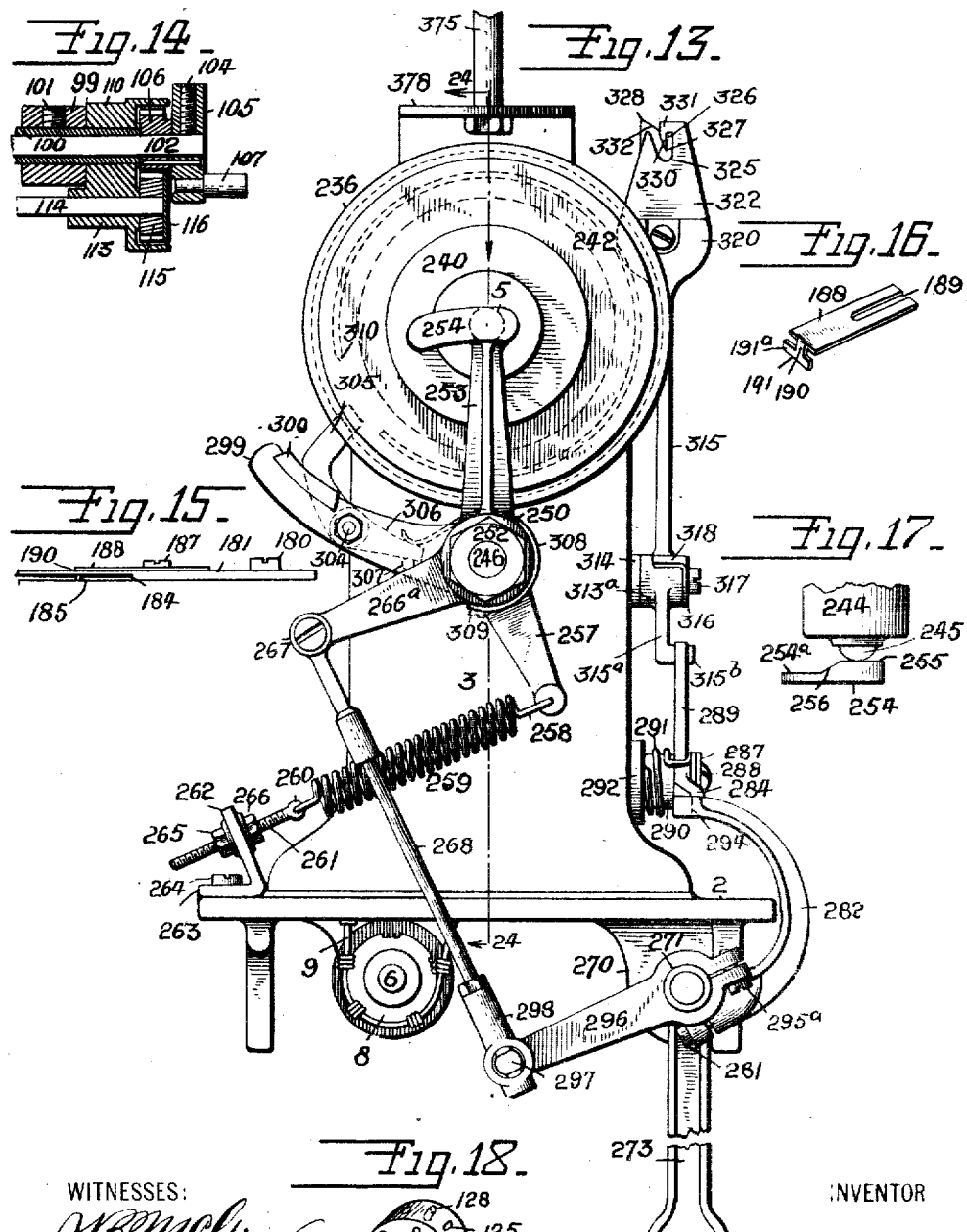

Jan. 8, 1924.  
W. N. PARKES  
SEWING MACHINE  
Filed Feb. 1, 1919  
1,480,106  
8 Sheets-Sheet 5
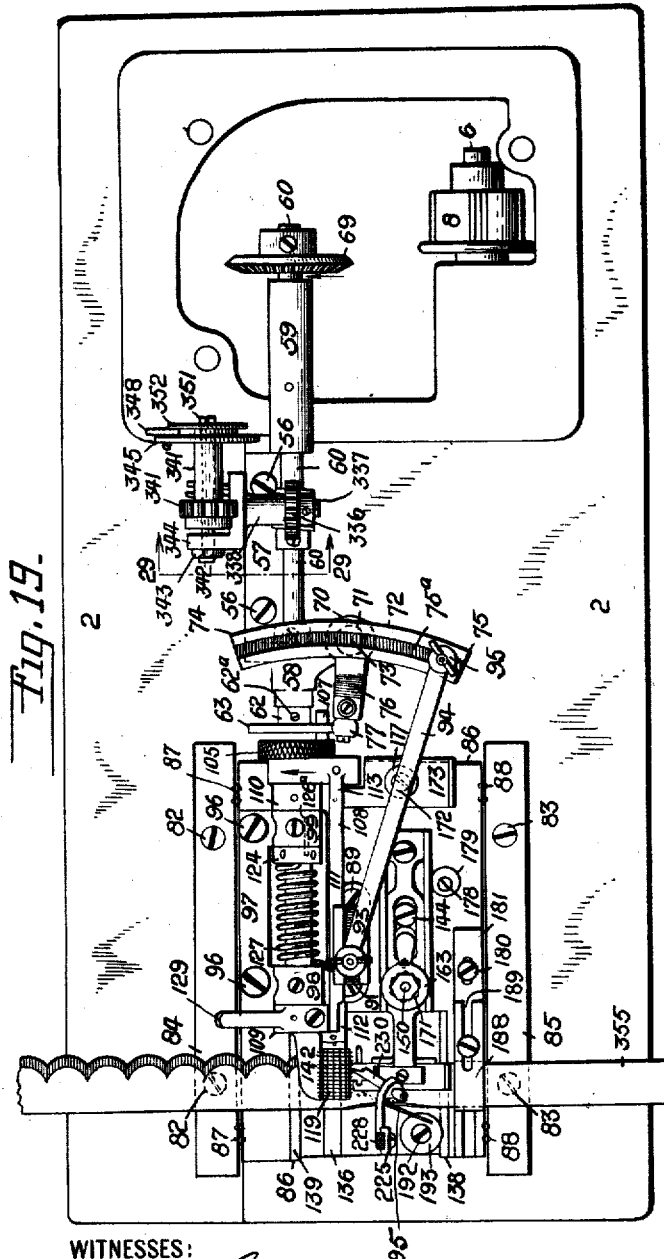
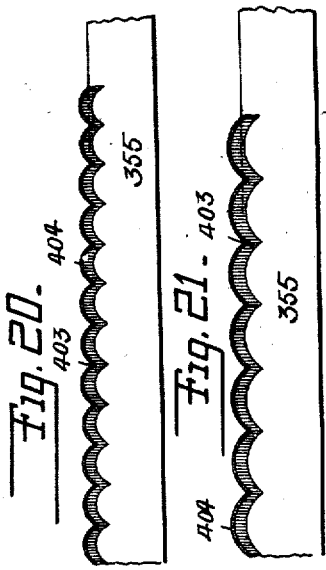
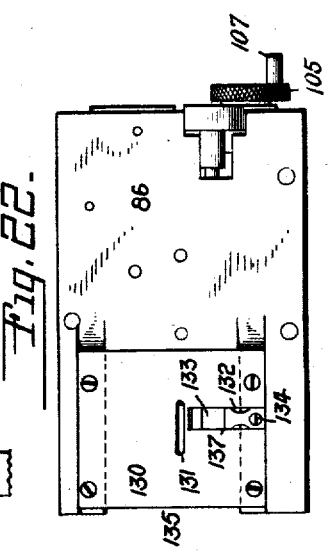
WITNESSES:
INVENTOR  
William N. Parkes.

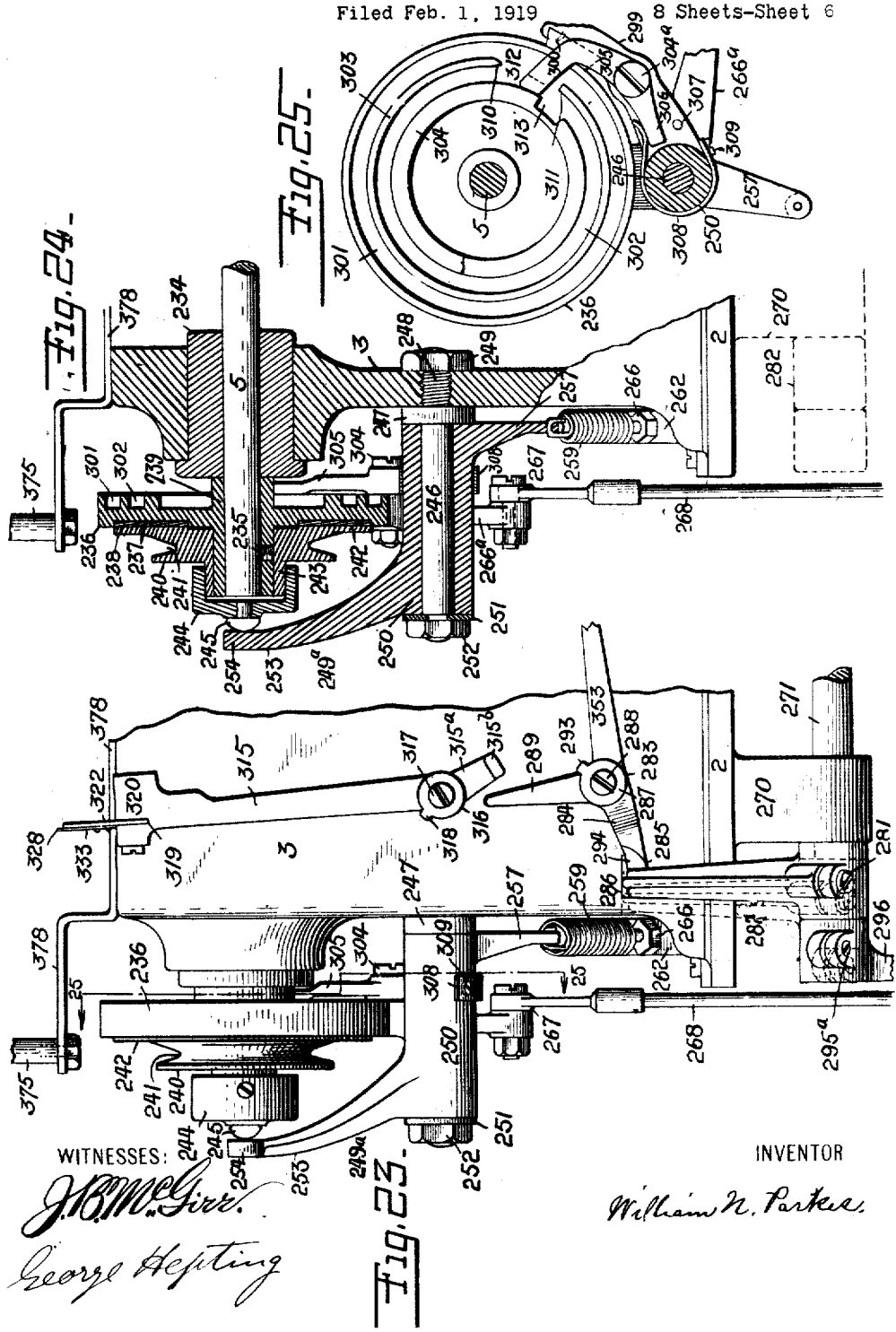

Jan. 8, 1924.
W. N. PARKES
SEWING MACHINE
Filed Feb. 1, 1919
1,480,106
8 Sheets-Sheet 7
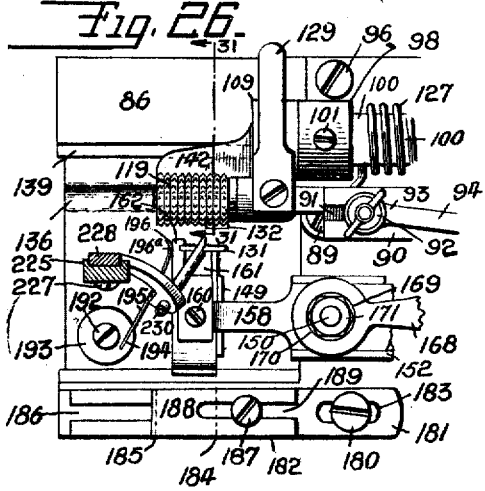
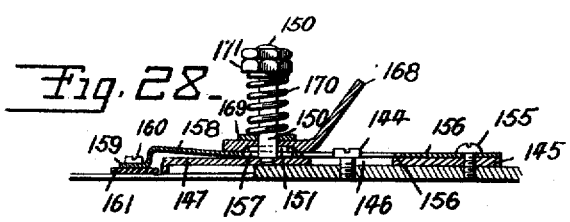
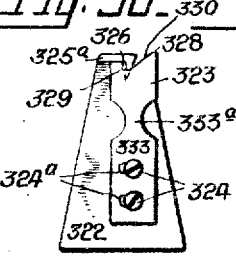
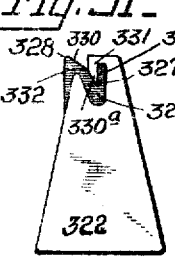
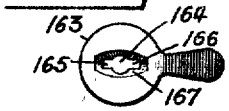
WITNESSES:
INVENTOR
William N. Parkes.

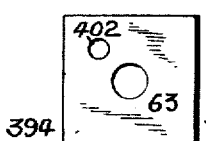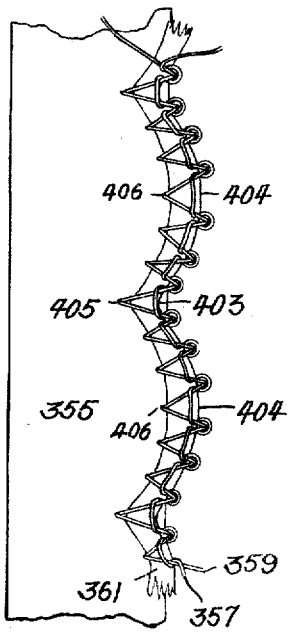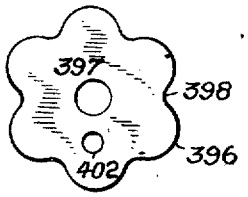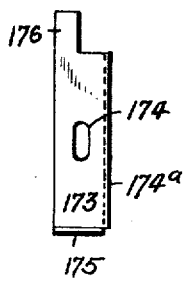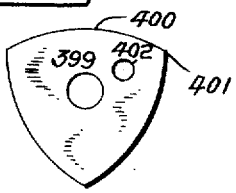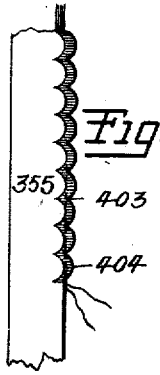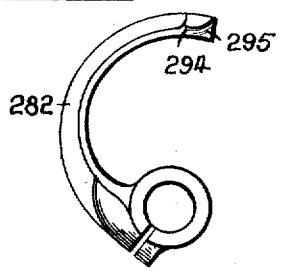

Patented Jan. 8, 1924.

1,480,106

UNITED STATES PATENT OFFICE.

WILLIAM N. PARKES, OF BROOKLYN, NEW YORK.

SEWING MACHINE.

Application filed February 1, 1919. Serial No. 274,532.

*To all whom it may concern:*

Be it known that I, WILLIAM N. PARKES, a citizen of the United States, residing in the borough of Brooklyn, in the county of Kings and State of New York, have invented new and useful Improvement in a Sewing Machine, of which the following is a specification.

This invention relates to the class of sewing machines that do ornamental stitch or embroidery work, and is preferably herein illustrated and described in connection with a lock stitch type of this class of machines.

The main object of the invention is to provide a machine to ornament the edge of fabric with scollop embroidery, and to place and hold the said embroidery as it is being made so the outer edge of it is located off the edge of the fabric and constitutes the finish of the same.

In doing work of this character by machines of the prior art, the embroidery is made on the body of the fabric near its edge, and then the fabric which extends beyond the outer edge of the embroidery is cut away thereby leaving the embroidery as the finish of the edge of the fabric.

The main advantage secured by the invention is the finishing of the edge of fabric with this edge embroidery without doing the expensive cutting away of the fabric, and without the consequent liability of cutting the stitches of the embroidery.

Among the other advantages the automatic features of the machine are noted. These are such that one operator can attend to a number of the machines, and the special construction of the machines together with these automatic features, adapts it to be used as a unit in a gang or multiple machine.

The embroidery made by the machine is of a superior quality. In the making of it an auxiliary thread is looped around each stitch connecting link of the needle thread, and is drawn to the extreme outer edge of the embroidery with sufficient tension to cause the said stitch connecting links of the needle thread to become twisted around or concatenated with the auxiliary thread at the said extreme outer edge. And a filling material is guided under the said stitch connecting links of the needle thread, and in the embroidery that is located over and away from the edge of the fabric this filling material is located between the said stitch connecting links of the needle thread and the stitch connecting links of the bobbin thread. This construction holds the stitches of the embroidery made off the edge of the fabric in place, makes a buttonhole finish along the said extreme outer edge of it, and gives body and a desirable embossed effect to it.

For the purposes of this application it is noted that in making a plain stitch, an embroidery stitch, or any kind of a stitch with a sewing machine, the needle presents a loop of thread to the co-operating stitch forming mechanism, and that this mechanism, in combination with other means, causes the thread or threads of which the stitch is made to be anchored in position; then a relative movement between the needle and the work is produced after which another stitch is made as before and so on.

Applicant defines the portion of the stitching thread at the point where it is anchored in position as the stitch, and the stitching thread which runs from one to another of the stitches as the stitch connecting links of thread.

In doing plain sewing the material which is being stitched is moved progressively forward; in doing zig zag stitching, in addition to the progressive forward movement, a relative lateral movement takes place between the needle and the material; and in doing scallop embroidery stitching, in addition to the progressive and relative lateral movements, a second relative lateral movement takes place, between the needle and the material, for the purpose of locating the zig zag stitches in the desired scalloped design.

Applicant defines the first of the foregoing movements as the plain stitch locating movement; the second as the zig zag stitch locating movement; and the third as the scallop embroidery stitch locating movement.

The zig zag stitch locating movement locates stitches alternately along two parallel lines and in this kind of stitching the stitch connecting links of thread run zig zag from one to the other of these stitches. across the path between the said two parallel lines of stitches; and the scallop embroidery stitch locating movement locates the said stitches, and the stitch connecting links of thread in the predetermined scallops or festoon designs.

When the edge of the fabric is finished with zig zag stitches, the stitches are made alternately in and off the edge of the fabric and the stitches which are made off the edge are held in position by the said edge, and the zig zag stitch connecting links of thread run from the stitches in the fabric to those off the edge of the fabric.

Referring now to the drawings; Fig. 1 is a front elevation, Fig. 2 is a rear elevation, and Fig. 3 is a bottom plan view of a machine embodying the invention.

Fig. 4 illustrates a detail showing a sectional view of one of the devices for holding a supply or cone of thread, and Fig. 5 illustrates how these devices may be held in position above the machine.

Fig. 6 is a front end view of the machine with the face plate removed to expose details of mechanism.

Fig. 7 is a top plan view of the base of the frictional work clamp, and Fig. 8 is a top plan view of the frictional work clamp located on a broken away part of the reciprocating work moving mechanism plate.

Fig. 9 is a top plan view, illustrating the construction of the stitch setting finger, the filler tube and its holder and Fig. 9ª is a side view of the parts illustrated in Fig. 9.

Fig. 10 is an enlarged detached bottom plan view of the feed wheel, and its comb, illustrating the comb in its operative position relative to the feed wheel; Fig. 10ª is a detail view illustrating the feed wheel end of the feed wheel shaft, and Fig. 11 is an end view of the feed wheel, illustrating a detail in connection with the relation between the feed wheel and its comb.

Fig. 12 is a view illustrating how the stitches of the scollop embroidery are formed over the stitch holding finger.

Fig. 13 is a rear end view of the machine, illustrating the stop motion parts, and their position when the machine is operating.

Fig. 14 is a horizontal sectional view on lines 14—14 of Fig. 2.

Fig. 15 is a side view of the adjustable guide for guiding the strips of fabric to the frictional work clamp.

Fig. 16 is a perspective view illustrating the adjustable member of the adjustable guide for the strip of fabric.

Fig. 17 is a top plan view of a detail of the stop motion mechanism looking in the direction of the vertical arrow Fig. 13.

Fig. 18 is a perspective view illustrating the feed wheel spring adjusting collar.

Fig. 19 is a top plan view of the bed of the machine illustrating the parts attached thereto in their relative positions.

Figs. 20 and 21 are views illustrating scollop embroidery done on the machine through the actions of cams shown in Figs. 32 and 33 respectively.

Fig. 22 is a bottom plan view of the reciprocating work moving mechanism plate.

Fig. 23 is an enlarged back view of the rear end of the machine with the stop motion parts in their normal position in full lines, and with the stop motion trip lever in dotted lines illustrating a detail.

Fig. 24 is a sectional view on lines 24—24 Fig. 13.

Fig. 25 is a sectional view on lines 25—25 Fig. 23, illustrating details in connection with the stop motion.

Fig. 26 is a full size top plan view of the reciprocating work moving mechanism plate, illustrating the relative position of parts.

Fig. 27 is a detached face view of a detail of the work moving mechanism stop motion tripping device.

Fig. 28 is a sectional view illustrating the construction of the frictional work clamp, and how it is attached to the work moving mechanism plate.

Fig. 28ª is a bottom plan view of the work clamp cam lever.

Fig. 29 is a view of the work mechanism stop motion tripping device on lines 29—29, looking in the direction of the arrows Fig. 19.

Figs. 30 and 31 are rear and front detached views respectively of the thread defect detector plates assembled.

Fig. 31ª is a sectional view taken on lines 31—31 of Fig. 26.

Figs. 32, 33 and 34 illustrate the kind of cams which may be used in the machine.

Fig. 35 illustrates the kind of scollop embroidery the cam shown in Fig. 34 will make.

Fig. 36 is a diagrammatic view illustrating how the auxilary looper thread is looped around the links of the needle thread.

Fig. 37 is a detached top plan view of the feed wheel shaft swinging bracket stop, and Fig. 38 is a side view of the stop motion catch lever.

In the drawings 1 is the arm of the machine, and 2 is the base. The lower end of the vertical part 3 of the arm is attached to the base by means of screws 4 (Fig. 3). A driving shaft 5 is journalled in suitable bearing in the arm and in suitable bearings in the base is journalled a hook shaft 6; and these shafts are operatively connected by means of a sprocket 7 which is secured to the shaft 5, and a sprocket 8 which is secured to the rear end of the shaft 6, and a sprocket belt 9 which is mounted on the said sprockets. The sprocket 7 is twice the size of the sprocket 8, therefore in the operation of the machine the hook shaft is revolved twice to each revolution of the driving shaft. The arm of the machine is provided with a face plate 9ᵃ as illustrated in Figs. 1 and 2.

To the forward end of the shaft 6 is secured a bevel gear 10, which meshes with a bevel gear 11, the latter being secured to a short transverse shaft 12, which is suitably journalled in a bearing projecting downwardly from the under side of the bed of the machine. To the end of the shaft 12 is secured a hook 13 which is provided with a beak 13ᵃ (Fig. 6). The hook carries, in a usual manner, a bobbin case 14 which is provided with a bobbin not shown. The bobbin case is held from rotating with the hook by means of a stop 15 which is secured to the under side of the bed of the machine as shown in Fig. 3.

To the forward end of the driving shaft 5 (Fig. 6) is secured a part 16, which carries a crank pin 17, on which is journalled the upper end 18 of a link 19. On a pin 20 which is secured in a bore by a screw 20ᵃ, is pivoted the upper end 21 of a swinging bracket 22. In suitable bearings in this bracket is mounted to reciprocate a needle bar 23, which is provided with a needle 24. The lower end of the link 19 is suitably, and in a usual manner, connected with the needle bar, so that when the shaft 5 revolves the needle bar, through the parts mentioned, is reciprocated longitudinally. The connection between the needle bar and the lower end of the link is of the usual character which permits the needle bar to be moved or vibrated laterally.

To the lower end of the bracket 22 is pivoted at 25 (Fig. 1) the forward end 26, of a pitman 27. In suitable bearings in the arm of the machine is journalled a short transverse shaft 28 as indicated in dotted line in Fig. 2. On the said transverse shaft is secured an eccentric, not shown, which engages the rear end of the pitman 27 so as to reciprocate the said pitman in a usual way each time the eccentric is revolved. The mechanism and its operation described in this paragraph is the same as that which is used in the well known Singer high speed lock stitch zig zag machine, mentioned further on in this specification. On the driving shaft 5 is secured a spiral gear 30, which is in engagement with a spiral gear 31, (shown in dotted outline Fig. 1), the latter gear is secured to the shaft 28. The gear 31 is twice the size of the gear 30, so it will be understood that the said transverse shaft is only revolved once to two revolutions of the driving shaft 5, and that from said transverse shaft and said eccentric the well known zig zag movement is transmitted to the needle bar, same as in the before referred to well known machine.

In the top of the arm of the machine is secured a post 32, provided with a thread eye 33. In the side of the arm of the machine are secured thread guides 34, 35 and 36. To the lower end of the bracket 22 is secured a thread guide 37, and in the lower end of the needle bar is formed a thread guide 38, and to the arm of the machine intermediate the thread guides 34 and 36 is suitably secured a needle thread tension device generally designated by 39. This tension device is provided with a slack thread spring 40, which normally impinges against an adjustable stop 41, and the tension device parts are mounted in a well known manner on a stud 41ᵃ which latter is secured in the arm of the machine so it may be circularly adjusted. By adjusting the stud to the left the tension of the spring 40 is increased, and vice versa.

At 42 (Fig. 6) is suitably pivoted a needle thread take-up lever 43, having part 44 on one side of its pivot, and part 45 on the other side. In the end of part 45 is formed a needle thread eye 46. The part 44 of the lever is located in a bore formed in bearing part 47 which is pivoted in and carried by the part 16. The take-up lever pivot 42 is fixed so when the driving shaft 5 of the machine is revolved, the bearing 47 is carried in a circle bodily around, and concentric with the axis of the shaft, and by this means the take-up lever is given a well known take-up movement.

I have now described, in a general way, the stitch forming mechanism of the well known Singer high speed lock stitch zigzag sewing machine, which, in addition to doing zigzag stitching, may be adjusted to do plain straightaway stitching. The invention as illustrated and described herein is preferably adapted for use in combination with this type of stitch forming mechanism.

The parts designated in the foregoing as "(not shown)" are well known parts of the said Singer zig zag machine. In incorporating the invention in this machine, substantially all of the stitch forming mechanism of it is preferably made use of, while, all of its feeding mechanism is omitted. The mechanism and devices which I have provided for use in combination with this stitch forming mechanism, to make a complete machine with my invention in it, will now be described.

On the driving shaft 5 is secured a worm 48, and next to the worm on the said shaft is pivoted a bracket 49; and a collar 50 which is secured on the shaft serves, in combination with the worm, to keep the bracket properly located longitudinally of the shaft. On the said bracket is formed a bearing part 51 through which a bore is formed, and in this bore is journalled the upper end of a vertically located shaft 52. The upper end of the said shaft extends above the bearing part 51, and on this end is secured a worm wheel 53 which is engaged by the worm 48. On the shaft 52, below the bearing part 51, is secured a collar 54 which, in combination with the hub 55 of the worm gear, serves to retain the shaft longitudinally in position.

To the top of the bed 2 of the machine is secured (Fig. 19) by means of screws 56, a bracket 57 provided with bearing parts 58 and 59 in which is journalled a cam shaft 60. The shaft 60 is held longitudinally in position by means of a collar 61 (Fig. 2), and the hub 62 of a cam 63, which cam is secured to the free end of the shaft 60 by a screw 62ª. The bearing part 59 extends freely through a bore 64 (Fig. 1) which is formed through the inner upright side of the arm of the machine. On the said part 59 is secured, by means of a clamping screw 65, an auxiliary bracket 66, provided at its upper end with a bearing part 67 in which is journalled the lower end of the shaft 52. To the lower end of the shaft 52 is secured a small bevel gear 68, which is in engagement with a larger bevel gear 69, that is secured to the rear end of the shaft 60.

The bracket 57 is provided with a horizontally extending arm 70, (Fig. 19), in which is journalled a shaft 71 which projects downwardly and is an integral part of a segmental T slot lever 72. The axis of the shaft 71 is at 73, and the part 74 of the lever extends horizontally from one side of the axis, and part 75 horizontally from the other side, and the lever is provided with a T slot 75ª, which is formed in a segment of a circle from one end of it to the other. The T slot crosses centrally the axis of the lever. An arm 76 extends horizontally and downwardly from the T slot lever, and this arm at its end is provided with a roller 77 that is in engagement with the cam 63. The arm 70 is provided with a downwardly extending bearing 78 (see Fig. 1), in which the bore for the shaft 71 is located. To the end of the shaft 71 is secured a disc 79 which serves to retain the said shaft in position. The bore for the shaft 71 passes vertically through the bearing 78, which is at the end of the arm 70, and the portion of this bearing which extends below the arm is cylindrical in shape.

A coil spring 80 is located on the periphery of the bearing 78. The upper end of this spring contacts in a usual manner, not shown, with the T slot lever, and the lever end of the spring is, at 81, located in a hole formed vertically through the disc 79. The disc, as before mentioned, is attached to the lower end of the shaft 71; it is attached to the said end by means of a screw, not shown, which screw passes through the disc and has a seat in the shaft. The periphery of the disc is provided with holes 82.

When these parts are assembled the coil spring acts to turn the T slot lever so its roller 77 is held in engagement with the periphery of the cam 63. To increase or decrease the tension of the spring on the lever the screw which clamps the disc to the end of the shaft 71 is loosened, and then the disc is adjusted circularly, by means of a pin inserted in the holes 82 of the disc, until the desired tension is secured when by means of the said screw the disc is again clamped securely to the end of the shaft.

To the top of the bed of the machine is secured (Fig. 19), by means of screws 82 and 83, gibs 84 and 85. Intermediate the said gibs is located a work moving mechanism reciprocating plate 86. And in grooves formed in the adjacent edges of the gibs and the plate are located bearing balls 87 and 88. This construction and these balls constitute a usual form of ball bearings on which the plate is free to reciprocate. On the top of the plate is secured, by means of screws 89, a bracket 90 (Figs. 2 and 26), which is provided with a T slot 91, in which is adjustably secured by means of a thumb nut 92, a usual form of bearing on which is pivoted the forward end 93 of a pitman 94. The other end of the said pitman is secured in a like manner, by means of a thumb nut 95, in the T slot 75ª of the lever 72.

To the top of the reciprocating plate 86 is secured, by means of screws 96, a feed mechanism bracket 97, which is provided with extending bearing arms 98 and 99, in which is located a bushing 100 (Figs. 14 and 26), which bushing is held in position by screws 101. In the bushing is journalled a primary feed wheel operating shaft 102, which at its forward end is provided with a head 103 (Fig. 6). To the rear end of the shaft 102 is secured, by means of a screw 104 (Fig. 14), a disc 105, and on the shaft next to the disc is a gear 106, which is securely connected in a usual manner to the disc. The disc is provided with a crank pin 107. The gear abuts the end of the bushing 100 and thereby takes the thrust in one direction longitudinally of the shaft 102, and the head 103 of the shaft abuts the other end of the bushing and thereby takes the thrust of the shaft in the other direction.

A feed wheel shaft swinging bracket 108 (Fig. 19), is provided with arm bearings 109 and 110; the arm 110 is pivoted on the extending rear end of the bushing 100, as best illustrated in Fig. 14, and the arm 109 is pivoted in a like manner, on the extending front end of the said bushing, (see Fig. 26) and the arms 98 and 99 of the feed mechanism bracket retain the swinging bracket in its operative position, and when it is in this position it may be swung on its pivot, the axis of which is coincident with the axis of the shaft 102. The arm bearings 109 and 110 extend from a connecting part 111, and, extending downwardly from the ends of the part 111, are feed wheel shaft bearings 112 and 113, (Figs. 19 and 14), in which is journalled a feed wheel shaft 114. On the rear end of the shaft 114 is secured a gear 115, which is in mesh with the gear 106. The gear end of the feed wheel shaft swinging bracket terminates into a housing for the gears, as is best illustrated in Fig. 14. A cap disc 116 is attached to the outer side of the gear 115, and this cap serves to close the part of the housing in which the said gear 115 is located, and the disc 105 closes the part of the housing in which the gear 106 is located.

To a reduced end 117 of the free end of the shaft 114 is secured, by means of a screw 118 (Figs. 10 and 10ᵃ), a feed wheel 119, provided with a hub 120. The end 117 of the shaft is a little shorter than the feed wheel so when the screw 118 is in its normal position of holding the feed wheel on the shaft it draws the hub 120 of the wheel against the shoulder 121 of the shaft. The feed wheel is held from turning on the shaft by means of a pin 122 which is located in the reduced portion of the shaft, and extends into a slot 123 formed in the end of the hub 120 of the feed wheel. The face of the hub of the feed wheel abuts the face of the bearing 112 of the swinging bracket.

The axis of the pivot of the feed wheel swinging bracket is coincident with the axis of the shaft 102, therefore turning the swinging bracket on its pivot does not disturb the engagement between the gears 106 and 115. And when the swinging bracket is turned on its pivot the feed wheel is moved bodily about the axis of the shaft 102.

On the periphery of the bushing 100 next to the bearing 99 is located an adjustable collar 124 (Fig. 19), in the periphery of which are formed adjusting holes 125, and in the side of the said collar are formed locating holes 126 (Fig. 18). In the bearing 99 is located a pin 126ᵃ as illustrated in dotted lines in Fig. 19. This pin registers with the holes 126 of the collar. Next to the collar on the periphery of the bushing is a feed wheel spring 127, one end of which is located in a hole 128 formed in the side of the collar (Fig. 18) and the other end of which engages the part 111 of the swinging bracket, as best seen in Fig. 19. To the top of the bearing 109 of the swinging bracket is secured a feed wheel lifter arm 129.

To the under side of the reciprocating plate 86 is secured, as illustrated in Fig. 22, a needle plate 130, provided with a needle slot 131. Through this needle plate is formed a slot 132, in which is located an embroidery depression spring 133 which spring is secured by means of a screw 134 to the under side of the reciprocating plate 86. The reciprocating plate is provided with a needle plate opening 135, which on the under side is covered by the needle plates. The construction of these parts is such that the under side of the needle plate is flush with the under side of the reciprocating plate, and the spring 133, and its attaching screw 134, are located so they are just below the surface of the under side of the said plates.

In the top of the needle plate is formed a concave depression 136, that extends from the edge of the plate to the slot 132. And in the embroidery depression spring is formed a concave depression 137 which is coincident with the depression 136. These depressions conform to the periphery of the feed wheel 119 which is located in them. The inner end of the feed wheel is in alignment with the inner edge of the spring 133. From the top of the reciprocating plate 86, at the front edge of the opening 135, is formed an incline 138 which extends from the top of the reciprocating plate to the needle plate, and at the rear edge of the said opening is formed the same kind of an incline 139.

In the periphery of the feed wheel is formed a series of V shaped grooves 140 and 141 (Figs. 10 and 11), which separate teeth 142. The grooves 140 are slightly deeper than the grooves 141. To the under side of the bearing 112 of the swinging feed shaft bracket is secured, by means of a screw 141ᵃ, a feed wheel comb 142, provided with teeth 143, which teeth are located in the grooves 140 of the feed wheel. The function of the comb is to comb from the feed wheel any embroidery, lint, thread or anything the teeth of the wheel may have picked up. It will be observed that, as the grooves 140 are deeper than the grooves 141, any threads or lint that may lodge longitudinally in the grooves 141 across the grooves 140, the teeth of the comb will dislodge from the wheel as well as anything that may lodge in the grooves 140.

On the top of the work moving mechanism reciprocating plate is adjustably secured, by means of a screw 144, the base 145 (Fig. 7) of a frictional work clamp device. The screw 144 passes through a slot 146 which is formed through the said base, and has a seat in the said plate. At the forward end of the base is formed a neck 147, which at 148 is bent downwardly, and terminates in a work guide 149. Projecting upwardly from the base is a tension spring post 150, in which is transversely secured in pin 150ᵃ having extending ends 151. The side edges 152 and 153 of the base, are turned upwardly, and intermediate these upturned edges is located the body portion 154, of a flat presser shoe lifter spring 154ᵃ which is secured by means of a screw 155 to the base. Through this spring is formed a slot 156, which is sufficiently larger than the slot 146 of the base, to permit the head of the screw 144 to pass through it and clamp the base to the reciprocating plate. Through the spring is also formed a slot 157 which is so constructed that the post 150, and the extending ends 151 of the pin that is located in the post, pass freely through the said slot. The end of a neck 158 formed on the free end of the flat spring, is bent downwardly, and terminates in a horizontally extending end 159, to the under side of which is pivotedly secured, by means of a pivot screw 160, a frictional presser shoe 161. The shoe has an extending end or toe 162 which crosses the needle slot 131. On the post 150, next to the presser shoe lifter spring, is located the presser shoe lifter spring control lever 163 (Fig. 28$^a$), which lever has an opening 164 through it that fits freely the said post. Extending laterally from the said opening 164 are ways 165 and 166 through which the extending ends 151 of the pin, carried by the tension spring post, pass freely. On the under side of the said lever, and surrounding the opening through the same, is formed an incline 167, and extending upwardly from the lever is an arm 168. Next above the lever on the post 150, is located a washer 169, against which impinges the presser shoe depression spring 170 that is also located on the post. The upper end of the post is threaded and on the same are located adjusting nuts 171, which serve to adjust the tension of the spring 170, so its pressure downwardly is sufficiently greater than the lifting tension of the spring 154$^a$ to exert the desired pressure on the shoe 161.

The foregoing described frictional work clamp device performs the function of frictionally clamping or pressing the work as the feed wheel moves it forward, against the top of the needle plate just in front of the needle slot, and the toe 162 of the presser shoe performs the function of frictionally pressing the work against the needle plate across the needle slot at the left side of the needle to hold the work against the side strain which is produced on it when the machine is operating, which side strain is mainly in a direction to the right. The presser shoe lifter spring 154$^a$ is so constructed that it normally tends to move upwardly against the lever 163, and through it against the action of the spring 170. When the lever is in the position shown in Figs. 19 and 28 the ends 151 of the pin 150 are located in the ways 165 and 166 of the lever, and when in this position the spring 154$^a$ is pressed downwardly, through the action of the spring 170, and the shoe is thereby pressed into engagement with the work. The extent of this pressure is determined by the adjustment of the nuts 171 that are located on the top of the tension spring post 150. To open the clamp the lever is moved on its pivot to a position at right angles to the position it is shown in in Fig. 19, and this movement brings the incline 167 in engagement with the extending ends 151 of the pin 150$^a$, and thereby lifts the lever upwardly until the surface of the under side of the lever rests on the top of the ends of the pin when the shoe will be disengaged from the work.

To the top of the plate 86, at its rear end, is secured by means of a shouldered screw 172 (Fig. 19), the feed wheel shaft swinging bracket stop 173 (Fig. 37). The screw 172 passes through a slot 174, which is formed through the said stop and has a seat in the reciprocating plate 86. The outer edge 174$^a$ of the stop is bent downwardly so that it engages the edge of the plate and thereby keeps the stop in position, and the outer end of the stop has an upwardly extending part 175 which is for use in adjusting the stop, and the inner end of it has an extending part 176 which is adapted to hold the swinging bracket up sufficiently to keep the feed wheel out of engagement with the work. A frictional spring washer 177 is located on the shoulder under the head of the screw 172 which shoulder is of sufficient length to permit the washer to frictionally hold the stop in position (Fig. 19).

When it is desired to have the feed wheel held out of engagement with the work, or out of engagement with the needle plate, the swinging bracket is manually turned upwardly, by means of the handle 129, and the stop is adjusted, by the means just described, so that the end 176 of it is under the bearing 113 of the swinging bracket, and when the parts are in this position the feed wheel is held out of engagement with the work or with the needle plate.

To the top of the plate 86, next to the front edge of the base 145 of the frictional work clamp device, is secured by means of screw 178, a washer 179 which is adjustably in engagement with the said front edge of the said base. The screw passes through a hole in the washer and has a seat in the top of the plate 86; and the said hole is located eccentrically relative to the axis of the washer as illustrated in Fig. 19. The draw of the friction of the work, when the machine is being operated, is in a direction away from the front of the machine and this causes a pull on the outer end of the work clamp in the same direction. The said washer serves as an adjustable abutment against the side of the work clamp to prevent it from being pulled out of position by the movement of the work.

To the reciprocating plate 86 is secured, by means of a screw 180 (Fig. 26), a base 181 of a narrow fabric guide 182. An adjusting slot 183 is formed through the said base and through this slot the body of the said screw freely passes into a seat in the plate.

The under side of the base, from its outer end to the dotted line 184, is cut away sufficiently to allow the tape or narrow fabric to pass freely under it. And from the end of the said base to the dotted line 185, a slot 186 is formed through it. On the top of the guide is secured, by means of a screw 187, the adjustable member 188 of the guide. A slot 189 is formed in the inner end of the said member, and through this slot the screw 187 freely passes into a seat formed for it in the top of the said base. A neck 190 (Fig. 16) of the adjustable member is located in and passes through the slot 186 of the said base, and the said neck at its outer end terminates into a fabric guide part 191, the face of which is indicated by 191ª.

The under space from 184 to 185 of the guide constitutes an adjustable way through which a strip of fabric may pass to the frictional work clamp and from it across the needle slot, and thence under the feed wheel. The dotted line 184 (Fig. 26) represents one wall of the said way, and the dotted line 185 the other wall, and it is these walls which guide the fabric. By adjusting the member 188 towards the outer end of the base of the guide the said way is made broader, and vice versa.

A disc 193 (Fig. 26) is secured to the needle plate by means of a screw 192. In this disc at 194, is secured an end of a narrow flat spring arm 195, the free end of which is bent as at 196. The apex horizontally of the bent part 196 of the said spring is in line with the center of the needle slot 131, and in practice this apex contacts with the work which passes between it and the edge of the toe 162 of the frictional shoe 161. As the work passes along, the spring causes the work to turn upwardly around the lower edge of the said part 162 of the shoe, and this serves as an additional means for holding the work from being moved to the right by the strain before mentioned which is on it when the machine is operating.

To the rear end of the transverse shaft 28 (Fig. 2) is secured a collar 197, in the face of which is formed a T slot 198, in which is adjustably secured a usual form of bearing on which is mounted the rear end of a pitman 199, which rear end is held on the said bearing by a thumb screw 200. The said bearing may be adjusted so its axis is coincident with the axis of the said shaft, in which position no movement will be transmitted to the pitman. The distance the bearing is adjusted away from the axis of the shaft determines the extent of movement that will be transmitted to the pitman. The other end of the pitman is mounted in a usual manner on the ball end 201, of a stem 202 (Figs. 2 and 6), which stem is located in an arm 203. The said arm is, by means of a screw 204, adjustably clamped to a looper carrying bar 205. This bar at its upper end is mounted in a bore, which is formed in a part 206 which part is located in a threaded bore formed in the machine as illustrated in Fig. 6, and the said part is locked in position by a screw 206ª. The lower end of the bar passes through a bore formed in a bearing 207, and terminates into a looper holding end 208. A collar 209 which is secured on the bar by means of a screw 210, contacts with the upper end of the bearing 207 and thereby restrains the bar from downward movement, and the upper end of the bar contacts with the end 211 of the bore in the bearing 206, and thereby the bar is retained in its operative position. A slot 212 is formed in the lower end of the bar, and in this slot is clamped, in a usual manner, the shank 213, of an auxiliary thread carrying looper 214, the free end of which is formed into a nose 215 (Fig. 12), through which passes a thread eye or way 216, the thread delivery part of which way is at the apex 217 of the nose.

When the machine is operating, the looper carrying bar 205 is, through the means just described, oscillated about its vertical axis, and the looper 214 is thereby oscillated. The location of the bar, and the construction of the looper, and the location of the thread delivery part 217 of its nose are such that the said thread delivery part of the looper is oscillated horizontally in a segment of a circle back of the reciprocating paths of the needle, and a considerable distance further to the right of the zone of the lateral movement of the needle than to the left as best illustrated in Fig. 12.

In a suitable bore in the lower part of the face of the machine (Fig. 6) is secured by means of a screw 218, a pin 219, on which is formed a flange 220. The pin passes freely through a usual slot, not shown, in the swinging bracket 22, which slot is of sufficient length to permit the bracket to have the desired extent of lateral movement to give the needle bar, which is mounted in it as before described, the desired extent of lateral movement. When the machine is operated, the lower end of the said bracket is oscillated laterally between a bearing 221 formed on the face of the machine and the said flange 220.

On the free end 222 of the pin 219 is clamped, by means of a screw 223, the upper end of a two part bracket 224. The upper part of the said bracket has a downwardly extending part 225, in which is formed a groove 226. In the said groove is secured, by means of a screw 227, the upper end of a part 228. Through the lower end of the part 228 is formed a bore in which is secured, by means of a screw 229, a cylindrical filler material guide 230 through which passes a way 231, (Fig. 12). On the inner end of the part 230 is formed a finger 232, which is shaped as illustrated in Figs. 9 and 9ª. The body of the cylindrical part 230 is located longitudinally at an angle relative to the horizontal plane, and also at an angle relative to the vertical plane. The way 231 is formed, in the center of the body of the cylindrical part 230, and terminates at the finger end of the part into a groove 233. The end of the finger and the groove that is in it extend at an angle in a horizontal plane, and the contour of this finger is such that it conforms to the inner contour of the scollop as is best illustrated in Fig. 12.

Referring now to the stop motion device which has been especially designed for use in the machine of the invention,—the rear end of the driving shaft 5, is journalled in a bushing 234 (Fig. 24). On the extending end of the said shaft is secured, by means of set screws 235, only one of which is shown, a driving wheel 236 in the outer face of which is formed a wide groove 237 that extends completely around the axis of the wheel, and concentric with the said axis. In the groove is located a suitable friction material 238. The wheel is provided with a hub 239, on which is mounted to revolve a pulley 240, provided with a belt groove 241, and a face 242 adapted to engage the frictional material 238, and with a hub 243. On the hub is located a cap 244, in which is located a pin having a head 245.

In the rear wall of the upright portion of the arm of the machine is secured a bearing pin 246, provided with a flange 247, and a threaded end 248, which threaded end is located in a threaded seat in the said wall, and is locked therein by a lock nut 249. On the bearing pin 246 is pivoted a stop motion power control lever 249ª, which is provided with a hub or base 250 that extends from the flange 247 of the pin bearing to the outer end of the said bearing. The lever is retained in position on the bearing in a usual manner, by means of a washer 251, and a nut 252, which clamps the washer against a shoulder formed on the bearing. An arm 253 extends upwardly from the base 250, and this arm at its free end terminates in a laterally extending head 254 (Fig. 17), on the inner side of which head are formed bearings 254ª and 255, and an incline 256 which runs from one to the other of the said bearings. A second arm 257 projects from the said base 250, and this arm extends downwardly, at an angle towards the back of the machine and to the end of this arm is secured an end 258 of a stop motion operating coil spring 259. The other end of the said spring is secured to an end 260, of a peripherally threaded round pin 261, which passes freely through a hole that is in the upturned part 262 of a bracket 263, which bracket is secured, by means of a screw 264, to the bed of the machine as illustrated in Fig. 13. Nuts 265 and 266, which are on the pin 261, serve as means to adjust the pin longitudinally in the bracket, and to lock it in position therein, and this adjustment is for the purpose of adjusting the pull of the spring 259 on the stop motion power control lever. A third arm 266ª projects from the said base 250, and this arm extends downwardly at an angle towards the front of the machine, and at its end 267 is connected in a usual manner the upper end of a connection 268.

From the under side of the bed 2 of the machine (Fig. 3) extend downwardly bearings 269 and 270 in which is journalled a tubular shaft 271. To the forward extending end of this shaft is secured, by means of a clamping screw 272, a downwardly projecting arm 273, and intermediate the base of this arm and the bearing 269 is a part 274 of the said shaft. On the shaft towards its rear end is secured, by means of a clamping screw 275, an arm 276 which extends in a horizontal direction from the said shaft towards the front of the machine. Through the end of this arm is formed a hole in which is located the upper horizontally extending end 277 of a downwardly extending connecting rod 278, a pin 279 serving in a usual way to retain the end of the connecting rod in the hole in the end of the arm. On the said tubular shaft, intermediate the base of the arm 276, and the bearing 270, is located a coil spring 280. And on the said tubular shaft next to the other side of the said bearing 270 is secured, by means of a clamping screw 281, a catch lever 282 which extends upwardly and around the edge of the bed of the machine as best illustrated in Fig. 13. A usual form of bearing, the hub of which is 292 (Fig. 13) is secured to the vertical part 3 of the arm of the machine (Fig. 2). On this bearing is pivoted a latch lever 283, which has a latch arm 284, provided with a latch end 285. Back of this latch end is normally located a laterally extending part 286, of the end of the catch lever 282. The latch lever is retained on its bearing by a washer 287 which is clamped, by means of a right hand screw 288, to the face of the end of the said bearing. This screw passes freely through a hole in the washer and has a seat in the bearing which extends from the hub 292. The bearing is of suitable length to permit the catch lever to turn freely thereon when the washer is clamped to the end of the said bearing. A trip arm 289 extends upwardly from the latch lever. On the periphery of the hub 290 of the said lever (Fig. 13) is located a spring 291, one end of this spring is located in a hole formed in the said hub 292, and the other end engages the trip arm 289 as illustrated in the said Fig. 13. The said washer 287 has a small stop arm 293 formed on it. This stop arm at its end is turned inwardly, and this end serves as a stop for the latch lever 283, the arm 289 of which is normally held in engagement with the end of the said stop arm through the action of the spring 291. On the end of the latch lever is formed an incline 294 (Figs. 2 and 23), and on the end of the catch lever is formed an incline 295. On the extreme rear end of the shaft 271 is secured by means of a clamping screw 295ª an arm 296 (Fig. 13), which arm at its free end is provided with a ball bearing 297, on which is mounted in a usual manner the lower end 298 of the connection 268.

From the base 250 of the stop motion power control lever projects a fourth arm 299; this arm extends towards the front of the machine at an angle upwardly, and near its end it is provided with a frictional material 300. In the inner side of the driving wheel 236 are formed grooves 301 and 302, and flanges 303 and 304, all of which are concentric with the axis of the wheel as illustrated in Fig. 25. On the inner side of the arm 299 of the stop motion power control lever is pivoted on a bearing having a slotted head 304ª, an auxiliary stop lever 305, as illustrated in Figs. 13 and 25. This auxiliary lever is provided with a tail end 306, which is normally held against a pin 307, by a flat spring 308, which spring is attached, by means of a screw 309, to the under side of the base 250 of the stop motion power control lever. The other end of the said auxiliary lever terminates in an end which turns inwardly as indicated by dotted line Fig. 25, and this inturned end is normally located in the groove 301 of the driving wheel, as indicated by dotted lines Fig. 13. One end of the flange 303, terminates at 310, and the other end at 311, and intermediate these ends is a space 312. In the flange 304 is formed a notch 313.

A usual form of bearing having a hub 314 (Fig. 13), is secured to the back of the vertical part 3 of the arm of the machine, and on this bearing is pivoted a drop lever 315 having a lower part 315ª the end 515ᵇ of which turns outwardly as shown in Fig. 13. This lever is retained on its said bearing in the same manner as the described latch lever 283, that is, by a washer 316 which is secured, by means of a left hand screw 317 to the face of the end of the said bearing. The washer is provided with an end 318 that turns inwardly, and serves as an adjustable stop against which the drop lever normally rests. The washer 316 is adjusted so that the drop lever normally rests a little to the left of the vertical, against the stop 318 as illustrated in Fig. 23. In a slot 319 formed in the head 320 of the drop lever is secured a thread defect detector 321. This detector consists of a rigid flat part 322 (Fig. 31), and a thin flat spring part 323, which latter part is secured by means of screws 324 to the rear side of the part 322. Slots 324ª serve as means for the lateral adjustment of the plate 323. At the upper end of the part 322, and on the rear side of the same is formed a boss 325ª, which is flush with the face of the rear side of the part 322. Through the upper end of the part 322 is formed an opening 325, and just below the boss 325ª is formed, in the part 322, a vertical slot 326, the lower end 327 of which extends into the opening 325. The edge of the upper end of the part 323 runs from its apex 328, obliquely to the slot 326, and from this point it extends horizontally to its inner edge 329 and from this point it extends upwardly to the edge of the boss 325ª as shown in Fig. 30. The oblique part 330 of the said edge is bevelled from its apex 328 to the lower end of the slot 326. This bevel part of the said edge laps over the end 330ª of a part 331 of the plate 322, and this construction forms a crotch 332. The end 330ª of the part 331, is oblique and bevelled on its side next to the plate 323, and the said spring part 323 has a neck 333ª formed in it which makes the upper portion of the said part yield more readily. A pin 334 is secured to the rear side of the arm of the machine (Fig. 2) which serves as a stop for the drop lever 315.

On the cam shaft 60 (Fig. 29) is secured a worm 335, which is in engagement with a worm wheel 336. The said worm wheel is secured on the rear end of a short transverse shaft 337, which is journalled in a bearing 338 that extends horizontally from the vertical portion 339, of a bracket 340. On the forward end of the said transverse shaft is secured a worm 340ª which meshes with a worm wheel 341 that is secured on the periphery of a sleeve 341ª (Fig. 19). The sleeve is journalled on a stud shaft 342, which shaft at its base is rigidly secured, by means of a nut 343, in the upper end of an arm 344, that extends from and is a part of the bracket 340. To the free end of the sleeve is secured a disc 345, on which is formed a hub 346. On the said hub is pivoted an auxiliary stop motion trip lever having a pivoted portion 347, and an end portion 348. A flat spring 349 is at one end located in a transverse slot 349ª formed in the extending end of a pin 350 carried by the disc 345, and at its other end the said spring impinges against the end 348 of the said lever, and the body of the spring extends around the said pivoted portion of the lever as illustrated in Fig. 27. The end of the stud shaft 342, extends to the face of the hub 346; clamped to this end of the said shaft, by means of a screw 351, is a disc 352, and between this disc and the disc 345 the auxiliary stop motion trip lever, and the spring which controls it, operatively fit. The latch lever 283 is provided with a horizontally extending arm 353, which has an end 354 that extends just beyond the periphery of the disc 345, and just contacts with it. This position of the end 354 of the said arm is in the path of the end of the part 348, and this brings about one engagement between these parts each time the disc 345 is revolved.

The reference character 355 (Fig. 19) represents a strip of fabric, 356 (Fig. 5) cone of needle thread and 357 the needle thread, 358 a cone of looper thread, and 359 the looper thread; 360 a cone of filler material, and 361 the filler material. A cone holding base 362 (Fig. 4), is provided with three ribs 363 (only one of which is shown) which ribs are spaced an equal distance apart on the periphery of the said base, and run from the upper end to the lower end of it. A downwardly extending rod 364 is secured centrally in the lower end of the base, and this rod at its lower end is split forming spring prongs 365 and 366, which prongs are bent as illustrated in the said Fig. 4. On the prongs rests the lower end 367 of a thread cone 368, which carries a supply of thread 369. The cone from its upper end 370 to its lower end 367, has a cavity 371 in it, and the upper end of this cavity serves as means for the upper end of the cone to be firmly pressed on the ribs 363 of the cone holder, and when in this position the rod 364 extends downwardly through the cavity, and the prongs 365 and 366 extend outwardly under the end 367 of the cone. These cones in practice are made of some pliable material such as pasteboard for example. The spring prongs 365 and 366 serve the purpose of holding the cone from falling off the holder, and also of permitting the cone when so held to be readily placed on the holder and removed therefrom.

The foregoing described cone holder has for its main purpose the holding of the cones in position as illustrated in Fig. 5. A plate 372 or any suitable device, may be held by any means a sufficient distance above the arm of the machine to permit the cones to be attached to the same by screws 373 as illustrated in the said Fig. 5. The cone holding the filler material is the same as those holding the thread. The plate 372 may be held a sufficient distance above the arm of the machine by upright rods 374 and 375 on the upper ends of which is suitably secured the plate 372. The lower end of the rod 374 is secured, by means of a screw 376 (Fig. 2) in a seat formed in the top of the head of the arm of the machine, and the lower end of the rod 375 is secured in an end 377 (Fig. 1) of a cover plate 378,
which latter is firmly secured, by means of screws 379, to the top of the arm of the machine.

In the top of the plate 378 is located a needle thread guide post 380 (Fig. 2), which has a vertical part 381, and a horizontal extending part 382. A loop of wire 383 is located in the horizontal part of the said needle thread guide post and the said loop serves as the primary guide for the needle thread. In the end of the part 382 is formed a bore 384, and in the top of the said end is a bore 385 that terminates into the bore 384 and this is the second guide for the needle thread. The end of the bore 384 is located above and vertically a little back of the thread defect detector 321.

In the top of the post 32 is formed an auxiliary thread guide 386 which passes from the top of the post and emerges from the side of the same at 387, as illustrated in dotted lines Fig. 1. On the top of the take-up guard flange is located an auxiliary thread guide provided with an eye 388. On the front side of the face plate is located an auxiliary thread tension device 389, which is provided with a usual slack thread spring 390 (Fig. 1). On the face of the face plate is located an auxiliary thread guide 391, and through the part 228 is formed an auxiliary thread eye 392. Through the said front side of the face plate is formed an eye 393 which serves as a guide for the filler material.

Referring to the cams for use in making the scollop embroidery designs herein illustrated,—394 represents the highest point of the periphery of the cam 63, and 395 the lowest point; 396 represents the highest point in the cam 397, and 398 the lowest point. The lowest point of the cam 399 is 400, and the highest point is 401. Through each of the cams is formed a hole designated by the reference character 402. In practice each of the cams is provided with a hub 62, only one of which is shown herein (Fig. 19), which hub adapts any of the cams to be readily secured to the end of the cam shaft 60.

Referring to the construction of the embroidery illustrated herein (Fig. 36), 403 represents the cusp of the outer edge of each of the embroidered scollops; 404 represents the apex of the said scollops, and 405 represents the inner stitch opposite the cusp, and 406, the inner stitch opposite the apex.

In the working of the machine, the cone 356 of needle thread is located centrally over the primary needle thread guide 383, and a sufficient distance above the said guide for the thread to be drawn freely from the cone. The needle thread passes through this guide to the way (384—385) which is formed in the end of the horizontal part 382 of the needle thread guide post, and from this point it passes through the vertical slot 326 of the thread defect detector and thence through the usual needle thread guides to the needle thread tension, and from there through the other usual needle thread guides to the needle. In practice the spring plate 333 is adjusted so the slot 326, as shown in Fig. 30, is just wide enough for the thread to pass freely through it.

The supply or cone of auxiliary thread may be located centrally over the post 32, and a sufficient distance above the same for the thread to be drawn freely from the supply. In practice this thread passes from the supply to the way (386—387) formed in the top of the said post 32, and from this point it passes through the thread eye 388, and thence down between the tension discs of the tension 389, and from there it passes upwardly through the thread guide 391, and then down and through the thread eye 392, and from this point it passes to and through the way 216 of the auxiliary thread carrying looper 214.

The supply of filling material is located over the eye 393, and from there it passes down and by the side to the right of the base of the tension 389 to the way 231 of the filler guide 230.

Any suitable guides may be used in place of the foregoing to guide the needle thread, the looper thread, and the filler material to the stitch forming mechanism; but it is desirable to have a very free delivery of these threads and the said filling material, and by the means described such a delivery is obtained.

In the present preferred form of the invention, to make the designs of scollop embroidery herein illustrated, the construction of the power transmission gear mechanism between the driving shaft 5 of the machine and the shaft 60 of the work moving mechanism is such, that the number of times the shaft 60 revolves divides equally by three, four or six. The diameter of the feed wheel 119, and the ratio of the gearing between it and the driving shaft 5 determines the speed of the movement of the fabric relative to the stitch forming mechanism, and consequently the length of a strip of fabric which will pass by the stitch forming mechanism during the making of a predetermined number of stitches.

In making the said designs of scollop embroidery herein illustrated, the said power transmission gear mechanism is so constructed that the driving shaft 5 revolves 96 times to one revolution of the shaft 60. Referring now specifically to the design illustrated in Fig. 20, and the construction of which is illustrated in the diagrammatic view in Fig. 36; to make this design of scollop embroidery the cam 63 is attached to the free end of the shaft 60, as it is shown attached in Fig. 19.

A supply of fabric may be provided in the form of a strip 355, as illustrated in Fig. 19, and this strip may be of any length, and the same may be held in any convenient form, for example loose in a receptacle or roving can, or on a roll so it may be drawn freely from the same. And as the embroidery of the strip of fabric proceeds the finshed strip may be allowed to run into any suitable receptacle or it may be wound by any suitable means on a spool or the like. At the beginning an end of this strip of fabric is passed through the narrow fabric guide 182, then under the frictional shoe 161 with the edge of it outside of the shoe running over the end 196° of the spring arm 195, and then under the feed wheel 119.

In finishing the edge of this strip of fabric with scollop embroidery, of the special design mentioned, the parts of the work moving mechanism are adjusted as illustrated in Fig. 19, the zigzag mechanism is adjusted to give the desired extent of lateral vibratory movement to the needle, and the device which oscillates the auxiliary looper laterally is adjusted to give the said looper the movement illustrated in Fig. 12.

As the machine is operated the driving shaft 5 revolves in a direction whereunder the periphery of the shaft located above its longitudinal axis moves toward the front of the machine, and through the power transmission mechanism between this shaft and the cam 63 the said cam is revolved in an opposite direction, and through the connection between the cam and the feed wheel the said feed wheel is revolved in the same direction in which the driving shaft 5 revolves. By this movement of the feed wheel the strip of fabric with which it engages is automatically drawn past the stitching mechanism, and as this feeding movement of the fabric proceeds the plate 86, through the action of the cam 63, is moved laterally to properly locate the stitches. When the roller 77 of the segmental T slot lever is at the point 394 of the cam 63, the stitch 405 is made, which stitch in each scollop is opposite the cusp of the scollops. And when the roller is at the point 395 of the cam the inner stitch 406 is made just in the outer edge of the fabric.

Four embroidered scollops, constructed as illustrated in Fig. 36, are made during one rotation of the cam 63, and when the cam 397 is used six scollops are made during one rotation of the cam. In the use of this last mentioned cam, to embroider the scollops of the shape as herein illustrated, the end of the pitman 94 is adjusted to the opposite side of the pivot of the lever 72. And in the use of the cam 399 only three scollops are embroidered to one rotation of the cam, and when this cam is used the connection of the pitman to the lever is the same as it is in the use of the first mentioned cam.

Referring now to the machine when in operation, the rear end of the pitman 199 is adjusted a sufficient distance away from the axis of the shaft 28 to give the desired extent of lateral movement to the auxiliary looper 214, and the end of the pitman 94 is adjusted in the T slot 75ª a sufficient distance from the axis 73 of the shaft 71 to give the desired extent of reciprocating movement to the work moving mechanism plate 86, and through it the desired lateral movement to the strip 355 of narrow fabric.

As the operation of the machine proceeds the auxiliary looper is oscillated back and forth in a horizontal plane, as illustrated in full and in dotted lines in Fig. 12. The location of the zone of the lateral movement of the needle is such, relative to the finger 232, that the needle in its reciprocating movement at the right, reciprocates at the right of the finger and over and away from the edge of the fabric, and in its reciprocating movement to the left of the finger it penetrates the edge of the fabric and anchors a stitch therein. And as the feed movement of the work progresses through the rotating movement of the feed wheel 119, the plate 86, and through it the fabric is moved laterally, through the action of the cam 63 and the connection between the same, and the plate, to properly locate the stitches in the scollop design.

The time of the action of the looper 214 is such, relative to the reciprocating movement of the needle, that at the time the needle descends to form a stitch at the right of the finger the thread delivery nose of the looper is sufficiently to the right of the reciprocating path of the needle to locate the auxiliary thread back of the needle, and the same relative action takes place when the needle descends to the left of the finger, and by this relative action of these parts the auxiliary looper thread 359 is looped around the connecting links of the needle thread, as illustrated in Fig. 36.

It will be observed that the location of the auxiliary thread eye 392 is to the left of the lateral zone of oscillation of the auxiliary looper, which zone is indicated by the full and dotted lines of the end of the looper in Fig. 12, and that the center of said zone of oscillation of the looper is a considerable extent to the right of the zone of lateral movement of the needle which zone is indicated by full and dotted lines of the penetrations of the needle in Fig. 12. From these relative positions and actions of these parts it will be understood that as the auxiliary looper moves to the position shown in dotted lines in Fig. 12, the auxiliary thread becomes taut and the necessary amount of this thread required for setting a stitch is at this time drawn from the supply through the tension 389, and against the action of the take-up spring 390. As the said looper moves to the position shown in full lines in the said Figure 12, the auxiliary thread becomes slack, and no drag is produced on the said auxiliary thread.

From the foregoing described relative movements of parts it will be understood that all the pull on the auxiliary thread as the stitches are being set is in a direction away from the edge of the fabric. The end of the finger 232 is so located relative to the back wall of the needle slot 131 that a sufficient number of stitches remain on the finger for the stitches to be securely locked in position for making the buttonhole finish along the edge of the scollops before they pass off of the finger.

The importance, is pointed out, of the construction being such that the stitch connecting links of needle thread remain over the said finger until the auxiliary looper has drawn the auxiliary thread to the outer edge of the embroidery so as to cause the said stitch connecting links of thread to be twisted with the auxiliary thread at the said outer edge, as illustrated in Figure 12 of the drawings. This finger, not only acts as a support for the setting of the stitches off and away from the edge of the fabric, but more particularly as a support for the twisting of the auxiliary and needle threads together so as to hold the stitches in place which are located off and away from the edge of the fabric, and also to form a button hole finish along said edge.

The filling material 231 passes freely to the groove 233 of the finger 232, and this groove is so formed and located that the filling material is retained in the groove by the stitches which are made over the finger, and he reciprocating path of the needle at the right of the finger is close to the finger and consequently it is close to the filling material. By reason of these relative positions of these elements the filling material is pushed to the buttonhole finish in the part of the scollop which is made off the fabric.

The thread delivery part 217 of the auxiliary looper being located to oscillate in the arc of a circle back of the zone of the lateral movement of the needle, in addition to performing the function of looping an auxiliary thread around the connecting links of needle thread as has been described, also helps to move the stitches off of the finger, as will be understood from Fig. 12. When the said looper is in the position shown in dotted lines in Fig. 12, it is drawing on the looper thread against the action of the tension 389 as before described, and this draw being in a direction away from the finger and in the direction of the end of the same it, together with the construction and location of the finger, brings about a condition whereby the embroidery passes freely off the finger as the fabric is moved forward by the feeding mechanism.

From reference character 234 to 313 inclusive, I have described a preferred form of stop motion device adapted for use in combination with my invention. When the machine is operating the parts of this stop motion are in the position best illustrated in Figs. 13 and 23, in which position it will be observed that the head 254, of the arm 253 is holding the pulley 240 in frictional engagement with the driving wheel 236. The pulley is revolved in a usual way by a belt connection (not shown) between a usual form of power transmitter (not shown) and the belt groove 241 of the pulley, and the frictional engagement between the pulley and the driving wheel causes the machine to operate.

From reference character 314 to 334 inclusive, I have described an improved tripping device for tripping the stop motion into action and thereby stopping the machine. As the machine operates the needle thread is drawn through the vertical slot 326 of the thread deflect detector of the said tripping device. In practice the part 323 of the device is adjusted so that the said slot is just wide enough for the thread to pass freely through it, so when a knot, slug, or thick place in the thread reaches the said slot it will not pass through it, and the result is the further movement of the thread draws the drop lever 315 from the position shown in full lines in Fig. 23, to the position shown in full lines in Fig. 2, from which latter position the lever falls to the position shown in dotted lines in the said Fig. 2.

And as the drop lever falls to this position the end 315ᵇ of it engages the latch lever 283, and moves it to the position it is shown in dotted lines in said Fig. 2. This movement of the latch lever releases the catch lever 282, and permits the spring 259 to turn the stop motion power control lever 249ᵃ on its pivot until the frictional material 300, with which the arm 299 of the lever is provided, comes into engagement with the periphery of the driving wheel 236.

And as this movement of the said control lever takes place, the head 254 of its arm 253 is located so that the bearing 254ᵃ is opposite the head 245 of the cap 244. This permits the pulley 240 to move away and become disengaged from the driving wheel 236, and just as this takes place the frictional material 300 is brought into engagement with the periphery of the driving wheel and the stopping of the machine is thereby commenced.

In the event of the stop motion being tripped into action, when the space or opening 312 in the flange 303 of the driving wheel is not opposite the inturned end of the auxiliary stop lever 305, the said inturned end rides on the flange 303 of the driving wheel until the said space reaches the said end when the said auxiliary lever, through the action of the spring 308, is turned on its pivot, and the inturned end is located in the groove 302 of the said wheel, and thereafter it rides on the periphery of the flange 304 (see Fig. 25) until the notch 313 reaches the said inturned end, and when this point is reached the inturned end is moved into the notch and the machine is stopped.

The notch 313 is so located relative to the cycle of movement of the machine, that when the auxiliary stop lever engages the notch 313 and stops the machine, the take-up 45 is just at the end of its upward stroke which is the point, as is well known, at which each stitch is set or completed in lock stitch machines.

From reference characters 335 to 345 inclusive, I have described an auxiliary stop motion tripping device. The object of this device, as has been stated, is for the purpose of automatically stopping the machine just previous to the exhaustion of the supply of bobbin thread. The construction of the device is such that the disc 345 of it is revolved once in a little less time than it takes the machine to use the supply of thread which one bobbin holds.

In a cycle of movement of said device, previous to the exhaustion of the supply of thread on a bobbin, the end 348 of the trip lever of the device comes into engagement with the end 354 of the arm 353 of the latch lever. When this engagement commences the said trip lever is in the position shown in dotted lines in Fig. 27. The tension of the spring 349 of the said device is so light that the engagement of end 348 of the trip lever with the end of the arm 353 of the latch lever, prevents the trip lever from revolving with the disc 345 until the said end 348 of the same is engaged by a pin 348ᵃ which is carried by the disc as illustrated in full lines in Fig. 27.

When this engagement takes place the trip lever is moved bodily with the disc until the latch lever is disengaged from the catch lever when the stop motion is tripped into action and operates to stop the machine in the same manner as before explained. After the stop motion is tripped into action the said auxiliary stop motion trip lever is moved through the action of the spring 349, to the position shown in dotted lines in Fig. 27. And when in this position it will be observed the stop motion may be turned to its normal position for the operation of the machine.

The arm 273 may be used to turn the stop motion to its normal position and thereby starting the operation of the machine as will be readily understood from the drawings. It will also be understood from the drawings that by the use of this arm the tubular shaft 271 may be moved, against the action of the spring 280, in a direction towards the rear end of the machine, and the stop motion thereby manually caused to act and stop the machine. The movement of the catch lever 282 to disengage it from the latch lever, when it is desired to manually stop the machine as stated, is illustrated by dotted lines in Fig. 23. It will be also understood from the drawing that the machine may be stopped by manually moving the stop lever 315 until it falls to the position it is shown in in dotted lines in Fig. 2.

It is obvious that various changes can be made in the construction of my device without departing from the spirit of my invention, and it is therefore to be understood that I do not wish to be limited to the exact means as herein disclosed.

One of the important features of my machine is the finger 232 which holds the threads extended away from the fabric as the stitches are being set or completed. It is obvious that means other than this particular construction of finger might be substituted for such finger, to hold the threads extended.

And while one of the main functions of this finger is to hold threads extended a varying distance away from the edge of the fabric as the stitches are being set, so the embroidery is made in scolloped or other design, it is desired that it be understood that these stitches may be held by the finger away from the edge of the fabric when no lateral movement is taking place between the stitch forming mechanism and the machine, and that when so held straight away embroidery may be made with a small part of it or with the major portion of it located away from the edge of the fabric. Obviously this may be done when the end of the pitman 94 is adjusted over the axis of the pivot of the T slot lever 72.

Further in this connection it is pointed out that there is a space under the neck 147 of the base 145 through which lace or other desirable material may be guided; that the back of the guide 149 will serve as a guide for said lace, and that the position of the plate 86 may be adjusted so that the outer stitches of the embroidery will penetrate the lace and the same be thereby attached to the edge of the embroidery.

And it is further desired that it be understood that it is not intended that the scope of this invention shall be limited to making the embroidery over or away from the edge of the fabric. Obviously the base 145 of the frictional work clamp device may be constructed so the guide part 149 of it will be located a sufficient distance to the right, for the fabric to be located to make all the embroidery within the edge of the fabric, or on the body of it. For example the said base may be constructed with the neck 147 of it short enough to secure this result.

It is further noted that there is space enough between the needle plate and the bearing 112 of the feeding mechanism, for the fabric to pass under the said bearing.

While the filler may be guided by mechanism not made integral with such finger 232, the combination of filler guide and finger is of practical value because the guide may not only serve as a support for the finger, but will also guide the filler to a point very favorable for the production of well formed work.

Applicant notes that he does not wish to be limited to the particular construction of his invention as herein disclosed, nor does he wish to be limited to the kind or construction of scallop embroidery, as it is obvious these may be changed without departing from the spirit of the invention.

Having now described my invention what I claim as new is:—

1. A sewing machine having a stitch forming mechanism, said machine adapted to make two rows of stitches, means whereby the said stitches are connected by links of thread or cord which runs back and forth across the path between said rows of stitches, means whereby the stitches of one of said rows are disposed at over and a varying distance away from the edge of the fabric, and means separate from the fabric whereby the stitches of the last mentioned row are held in position as they are being made and set.

2. A sewing machine provided with means for making stitches in the edge of fabric, means for making stitches a varying distance off the edge of the fabric, the stitches made off said edge connected by stitch connecting links of thread with the stitches made in said edge, and means for looping an auxiliary thread around the said stitch connecting links of thread.

3. A sewing machine provided with means for finishing the edge of fabric with scallop embroidery, the said embroidery comprising one row of stitches located in the edge of the fabric, one row of said stitches located in scallop design off the edge, stitch connecting links of thread running from the stitches made in the fabric to those made off the edge, means for looping an auxiliary thread around said stitch connecting links of thread, and means whereby the said auxiliary thread is drawn in line with the row of stitches located off the edge of the fabric.

4. A sewing machine having a stitch forming mechanism adapted to make two parallel rows of stitches, means whereby the said stitches are connected by stitch connecting links of thread which runs back and forth across the path between said rows of stitches, means for producing a relative lateral movement between said stitch forming mechanism and the fabric whereby the said stitches are disposed in a scallop design with the outer row of stitches located over and away from the edge of the fabric, a finger over which the said stitch connecting links of thread are located as the stitches are being made and set, and means for guiding a filling material under the said stitch connecting links of thread.

5. A sewing machine comprising means for making scallop embroidery, one edge of said embroidery located off the fabric and one edge in the fabric, a finger over which the stitch connecting links of needle thread are located as the stitches are being formed, means for looping an auxiliary thread around the said stitch connecting links of thread, and means for drawing the said auxiliary thread so that it becomes twisted with the stitch connecting links of thread along the edge of the embroidery which is located off the fabric.

6. A sewing machine comprising means for making stitches alternately in and off the edge of fabric, the stitches made off the edge located a varying distance from the said edge, means for looping an auxiliary thread around the stitch connecting links of needle thread, and means for drawing said auxiliary thread so as to make a button hole finish along the edge of the embroidery which is located off the edge of the fabric.

7. In a sewing machine, a stitch forming mechanism comprising a thread carrying needle, the said stitch forming mechanism adapted to make scollop embroidery composed of stitches, means for placing the said embroidery as it is being made so the stitches of the outer edge of it are located off the edge of the fabric, means for looping an auxiliary thread around the connecting links of needle thread, and means whereby the said auxiliary thread is drawn so the connecting links of needle thread are twisted around the said auxiliary thread at the outer edge of the said embroidery.

8. In a sewing machine, a stitch forming mechanism comprising a rotary shaft, a hook, the said hook provided with a bobbin of thread, a rotary feeding mechanism operated from the movement of the said rotary shaft, a stop motion, a device for tripping the said stop motion into action just before the exhaustion of the said bobbin of thread, and means whereby the said device is operated by engagement of the said rotary feeding mechanism.

9. A sewing machine having a stitch forming mechanism adapted to make two rows of stitches, the said stitches connected by stitch connecting links of thread which run back and forth across the path between said rows of stitches, means for producing a relative lateral movement between said stitch forming mechanism and the fabric so as to locate the outer row of said stitches in scallops the stitches of which are disposed at over and away from the edge of the fabric with the said stitch connecting links of thread covering continously the edge of the fabric, and a finger over which said stitch connecting links of thread are located as the stitches of the outer row of stitches are being made and set.

10. A sewing machine adapted to make embroidery stitches, means for locating the said stitches in an embroidery scollop design, a tube located and adapted to guide a filling material under the said stitches, a finger formed on the end of the said tube over which the connecting links of needle thread are located as the stitches are being set, and the said finger provided with a channel along which the said filling material passes.

11. A sewing machine comprising a feeding mechanism, a stitch forming mechanism having a vertically reciprocating and laterally vibrating needle, a finger located between the reciprocating paths of the said needle, the said finger extending at an angle relative to the direction of the feed movement of the work, the said finger provided with a channel, means for guiding a filling material to the said channel, and means for moving the work laterally.

12. A sewing machine comprising a vertically reciprocating and laterally vibrating needle, a stationary finger located between the vertically reciprocating paths of the said needle over which the links of needle thread pass as the stitching progresses, and a laterally oscillating thread carrying loper the center of the zone of oscillation of which is to one side laterally of the center of the said finger.

13. A sewing machine provided with a pivoted frame, a reciprocating needle bar located in bearings in the said frame, the needle bar provided with a needle, a pin having a bearing on it for guiding the lower end of the said frame, means for oscillating the frame laterally and thereby oscillating the needle bar laterally, a device provided with a finger, the said device located on the extending end of the said pin, and the said finger located between the vertically reciprocating paths of the needle.

14. In a sewing machine, a vertically reciprocating needle, means for producing a relative lateral movement betwen said needle and the work so that stitches are made in and off the edge of the fabric, means for producing a second relative lateral movement between the needle and the work to dispose said stitches in embroidered scallops with the stitches of the outer edge of the scallops located off the edge of the fabric, means for looping an auxiliary thread around the stitches made off the edge of the fabric, and means whereby the connecting links of the needle thread are twisted around the said auxiliary thread along the edge of the scallops which is located off the edge of the fabric.

15. In a sewing machine, a stitch forming mechanism, a feeding mechanism comprising a pivoted bracket, a feed wheel carried by the said bracket, and a comb for the said feed wheel which is attached to the bracket.

16. A sewing machine having a vertically reciprocating and laterally vibrating needle, means for producing a relative lateral movement between the said laterally vibrating needle and the work so the stitches are disposed to make embroidered scallops with the stitches of the outer edge of the scallops located off the edge of the work, and means for holding the stitches in place which are made off the edge of the work.

17. In a sewing machine, a vertically reciprocating and laterally vibrating needle, a rotating feeding mechanism provided with a feed wheel, a reciprocating plate, the said feeding mechanism mounted on the said reciprocating plate, and the said plate provided with an embroidery yielding spring which is located under the inner end of the said feed wheel.

18. In a sewing machine, a vertically reciprocating and laterally vibrating needle, a plate adapted to reciprocate in the direction in which the needle vibrates laterally, a rotary feeding mechanism mounted on the said plate, a cam which revolves in a vertical plane, a suitably mounted lever which is oscillated by the said cam in a horizontal plane, and a connection between the said lever and the said plate.

19. A sewing machine for finishing the edge of fabric with scallop embroidery the outer edge of which is located off the edge of the fabric, means for holding the fabric taut as it is being embroidered including a shoe which yieldingly presses on it, and a spring arm located at the side of the said shoe which engages the fabric.

20. A sewing machine for finishing the edge of fabric with scallop embroidery the outer edge of which is located off the edge of the fabric, the said means comprising a needle plate provided with a needle slot, means for holding the fabric taut as it is being embroidered including a shoe which yieldingly presses on the fabric, the said shoe provided with a toe that crosses the needle slot, and a spring arm at the side of the said shoe that engages the work.

21. A sewing machine having a stitch forming mechanism adapted to make embroidery stitches, means for moving the fabric to locate the said stitches to finish the edge of the fabric with scallop embroidery, the said means comprising a reciprocating plate, a swinging bracket mounted on the said plate, a feed wheel shaft journalled in bearings extending from the said bracket, a feed wheel attached to the end of the said shaft, the said feed wheel normally held in engagement with the fabric by means of a spring, and an adjustable stop for holding the said feed wheel out of engagement with the fabric.

22. A sewing machine provided with means for automatically finishing the edge of a strip of fabric with scallop embroidery composed of stitches the stitches of the outer edge of which are located off the edge of the fabric, means for holding the said strip of fabric taut as it is being embroidered comprising a frictional presser shoe, a spring, means intermediate the said spring and the said shoe whereby the shoe is yieldingly pressed into engagement with the fabric through the action of the spring, and means for lifting the shoe from the fabric against the action of the spring.

23. A sewing machine provided with a stitch forming mechanism adapted to make embroidery stitches, means for locating the said stitches to finish the edge of fabric with scallop embroidery the outer edge of which is located off the edge of the fabric, the said means comprising a plate adapted to reciprocate, a feeding mechanism mounted on the said plate, means for reciprocating the said plate comprising a pivoted lever, a segmental T slot formed in the said lever and located so that it crosses centrally the pivot of the lever, and a connection between the said slot and the said plate.

24. In a sewing machine, a stitch forming mechanism comprising a hook, the said hook provided with a bobbin of thread, a feeding mechanism adapted to automatically feed a strip of material past the said stitch forming mechanism, a work moving mechanism for moving the work to place the stitches to make embroidered scallops, a device for stopping the machine just before the exhaustion of the said bobbin of thread, and an element of the said work moving mechanism adapted to operate the said device.

25. A sewing machine having a vertically reciprocating and laterally vibrating needle, a plate adapted to reciprocate, a feeding mechanism mounted on the said plate, means for operating the said feeding mechanism, a lever pivoted to oscillate in the same plane in which the plate is adapted to reciprocate, means for oscillating the said lever, a connection, one end of the said connection connected to the said lever and the other end to the said plate, and means for adjusting the lever end of the said connection so it is located centrally over the axis of the pivot of the lever.

In testimony whereof I have signed my name in the presence of two subscribing witnesses.

WILLIAM N. PARKES.

Witnesses:
A. BELL MALCOMSON,
THEO. H. FRIEND.